C. SANDERMANN.
MECHANICAL MOVEMENT.
No. 178,962. Patented June 20, 1876.
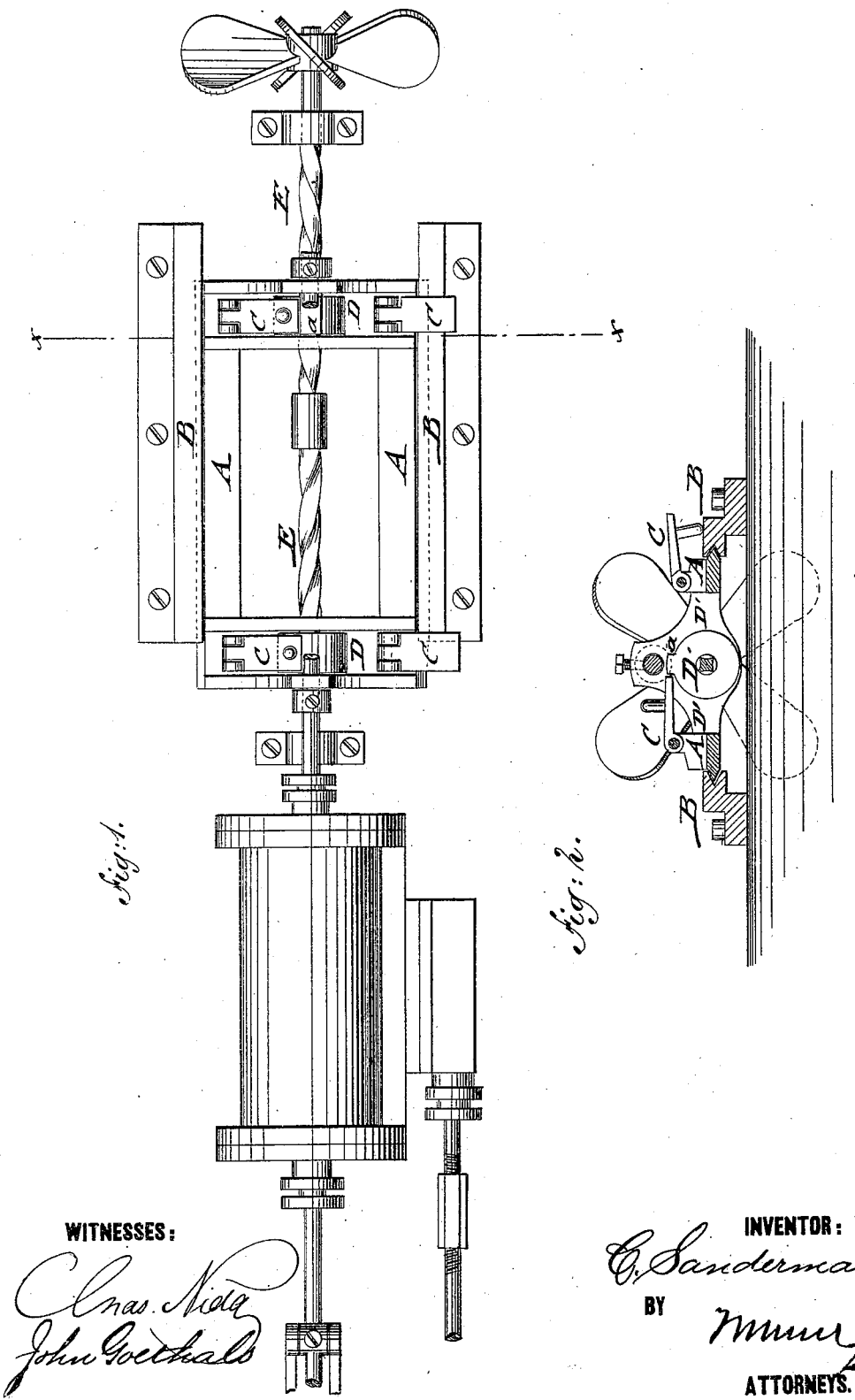

UNITED STATES PATENT OFFICE.

CHARLES SANDERMANN, OF ELIZABETHPORT, NEW JERSEY.

IMPROVEMENT IN MECHANICAL MOVEMENTS.

Specification forming part of Letters Patent No. 178,962, dated June 20, 1876; application filed May 22, 1876.

*To all whom it may concern:*

Be it known that I, CHARLES SANDERMANN, of Elizabethport, county of Union and State of New Jersey, have invented a new and Improved Mechanical Movement, of which the following is a specification:

In the accompanying drawing, Figure 1 represents a plan view of my improved mechanical movement as applied to the shaft of a screw-propeller. Fig. 2 is a vertical transverse section of the same on line $x\,x$, Fig. 1.

Similar letters of reference indicate corresponding parts.

My invention relates to an improved mechanical movement for changing reciprocating rectilinear into continuous rotary motion, being applicable to revolve the shaft of screw-propellers, and for other purposes.

The invention consists of a reciprocating carriage, with hinged stops at both sides, that act on movable cam-rollers, traversing on the shaft-sections, with spiral twists or grooves in opposite direction, so as to produce continuous rotary motion of shaft by the reciprocating motion of the cam-rollers.

In the drawing, A represents a reciprocating carriage that is guided with the least amount of friction in grooved side rails B. The carriage A is reciprocated by being clamped to the extended piston-rod of a steam-cylinder or other power. The carriage A is provided near both ends with hinged stop-plate C, applied symmetrically at both sides and bearing on revolving collars or rollers, D, of a shaft, E, that is parallel to the longitudinal axis of the carriage and the actuating piston-rod. The intermittently-revolving collars or rollers D of shaft E are acted upon by cross-plates D′ of the carriage, and have projecting cams $a$ that come in contact with the stop-plates C. The stop-plates C are so connected to suitable mechanism that the stops at one side or at the other side of the shaft may be alternately brought in contact with the revolving cam-rollers, as required. The cam-rollers C traverse on the shaft E, which is spirally twisted or grooved from a center point in opposite direction to produce alternately the action of one of the cam-rollers in one direction, and of the other rollers in the opposite direction, of the reciprocating carriage, so as to impart continuous rotary motion to shaft E. The stop-plates C come alternately in contact with the cams of the collars or rollers, and retain one roller which produces by its axially-fixed but longitudinal transverse motion the rotation of the shaft, while the other collar follows the rotation of the shaft. The motion of the shaft may be reversed in an instant by changing the stop-plates, by raising first one set of stop-plates and bringing those at the opposite side of the carriage in contact with the cam-rollers. This furnishes a more rapid mode of reversing the screw when applied to a propeller-shaft than by the present mode of cutting off and reversing the steam in the cylinder. This mechanical movement is mainly designed for revolving the shafts of screw-propellers, as the engine required takes up less space and admits the quicker reversing of the screw independently of the steam-supply to the cylinder.

Having thus described my invention, what I claim as new, and desire to secure by Letters Patent, is—

1. A mechanical movement for changing reciprocating rectilinear into continuous rotary motion, consisting of a guided reciprocating carriage having hinged stop-plates at both sides, and cross-pieces, in combination with traversing cam-rollers and shaft-sections, being spirally twisted or grooved in opposite direction, substantially in the manner and for the purpose specified.

2. The combination of the hinged stop-plates at both sides of the reciprocating carriage with the traversing cam-rollers and spirally-twisted shaft to produce by the alternate contact of stop-plates at one side of the shaft, or of those at the other side, the reversing of the shaft, substantially as specified.

CHARLES SANDERMANN.

Witnesses:
 H. HARTMANN,
 OTTO BALTZER.